United States Patent
Fukushige et al.

(10) Patent No.: US 7,513,942 B2
(45) Date of Patent: *Apr. 7, 2009

(54) FINE PARTICLE DISPERSION, INK COMPOSITION USING THE SAME, AND INK-JET RECORDING METHOD

(75) Inventors: Yuuichi Fukushige, Shizuoka-ken (JP); Norihide Shimohara, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 623 days.

This patent is subject to a terminal disclaimer.

(21) Appl. No.: 11/080,562

(22) Filed: Mar. 16, 2005

(65) Prior Publication Data

US 2005/0206713 A1    Sep. 22, 2005

(30) Foreign Application Priority Data

Mar. 16, 2004    (JP)    ............................. 2004-075060

(51) Int. Cl.
*C09D 11/10* (2006.01)
*C09D 11/02* (2006.01)
*C09D 11/00* (2006.01)

(52) U.S. Cl. .............. 106/31.46; 106/31.13; 106/31.27; 106/31.28; 106/31.26; 106/31.25; 106/31.43; 106/31.47; 106/31.48; 106/31.49; 106/31.5; 523/160; 523/161

(58) Field of Classification Search .............. 106/31.13, 106/31.27, 31.28, 31.26, 31.25, 31.43, 31.46, 106/31.47, 31.48, 31.49, 31.5; 523/160, 523/161

See application file for complete search history.

(56) References Cited

U.S. PATENT DOCUMENTS

| | | | |
|---|---|---|---|
| 2002/0032252 A1* | 3/2002 | Ishizuka | ...................... 523/160 |
| 2004/0010052 A1* | 1/2004 | Ishizuka et al. | ................ 522/75 |
| 2004/0221767 A1* | 11/2004 | Ishizuka et al. | .......... 106/31.27 |

FOREIGN PATENT DOCUMENTS

| | | | |
|---|---|---|---|
| JP | 56-157468 A | | 12/1981 |
| JP | 58-45272 A | | 3/1983 |
| JP | 62-241901 A | | 10/1987 |
| JP | 2001-123097 A | | 5/2001 |
| JP | 2001181549 A | * | 7/2001 |
| JP | 2001-262018 A | | 9/2001 |
| JP | 2003-48366 A | | 2/2003 |
| JP | 2003-48371 A | | 2/2003 |
| JP | 2004-323723 | * | 11/2004 |

* cited by examiner

*Primary Examiner*—Sanza L McClendon
(74) *Attorney, Agent, or Firm*—Sughrue Mion, PLLC

(57) ABSTRACT

In a fine particle dispersion, fine particles including an oil-soluble dye having an oxidation potential higher than 1.0 V vs SCE and a polymer having at least one of an amide group, a glycidyl group and a hydroxyl group are dispersed in an aqueous medium. Further, an ink composition includes the fine particle dispersion.

23 Claims, No Drawings

FINE PARTICLE DISPERSION, INK COMPOSITION USING THE SAME, AND INK-JET RECORDING METHOD

CROSS-REFERENCE TO RELATED APPLICATION

This application claims priority under 35 USC 119 from Japanese Patent Application No. 2004-75060, the disclosure of which is incorporated by reference herein.

BACKGROUND OF THE INVENTION

1. Field of the Invention

The present invention relates to an aqueous fine particle dispersion comprising a dispersible polymer having a specific structure and an oil-soluble dye, an ink composition comprising the fine particle dispersion, and an ink-jet recording method using the ink composition.

2. Description of the Related Art

As use of computers has become widespread in recent years, ink-jet printers have become to be widely used not only in offices but also in homes for printing on paper, film and cloth. Oil-based inks, aqueous inks and solid inks are well-known as ink-jet recording inks, and aqueous inks are particularly advantageous in terms of easiness of production, ease of handling, low odor-generating properties and high safety. Further, aqueous inks are the type of ink predominantly used.

The majority of aqueous inks have advantages such as high transparency and high color density since water-soluble dye, which is dissolved in a molecular state, is used therein. However, because such dye is water-soluble, the aqueous inks suffer from disadvantages such as poor water resistance, a tendency to bleed when printing on paper thus significantly deteriorating print quality, and poor light fastness. Further, significant deterioration in preservability of images occurs, due to the influence of oxidizing gases ($SO_x$, $NO_x$, ozone etc.) on recording paper (hereinafter, also referred to as photo quality paper) provided thereon with an inorganic fine particle-containing porous ink-receiving layer.

Aqueous inks using pigments or dispersible dyes have been proposed in order to solve the problems described above (see Japanese Patent Application Laid-Open (JP-A) No. 56-157468).

However, although the water resistance of such aqueous inks is improved to a certain extent, it is not improved to a satisfactory degree and problems remain such as poor storage stability of pigments or disperse dyes dispersed in such as aqueous inks and a tendency for ink discharging openings clog easily. Further, the problem exists that inks using a pigment or a dispersible dye have poor permeability into photo quality paper, and the pigment or dye is easily removed from the surface when rubbed by a hand.

On the other hand, a method of incorporating an oil-soluble dye into a polymer has been proposed (see, for example, JP-A Nos. 58-45272 and JP-A 62-241901). However, the ink-jet ink obtained by this method is poor in tone and inferior in color reproducibility, and particularly poor in image durability against oxidizing gases and in rubbing resistance when printing on photo quality paper.

An ink provided with excellent coloration and rubbing resistance by introducing a salt-forming group and a polyalkylene oxide group to a polymer has been proposed (see, for example, JP-A No. 2001-123097), which has excellent rubbing resistance against rubbing with fingers, but is poor in high-level rubbing resistance against rubbing with an eraser.

Additionally a method of improving tone and rubbing resistance by using a high-boiling point organic solvent and a dye has been proposed (see, for example, JP-A No. 2001-262018), but the improvement is insufficient in cases where high-leveled image durability is required.

As described above, an ink composition containing a fine particle dispersion that is easy to handle and has low odor-generating and high safety properties; wherein the particle size of the dispersion particles is small and the dispersion has superior dispersion stability and storage stability such that when the particle dispersion is applied to ink the ink is free from clogging at the end of a nozzle and has superior discharge stability; which has superior coloration and tone (hue) regardless of the type of paper used; which has superior ink permeability even when using the photo quality paper mentioned above; which has superior water resistance after printing, particularly superior image preservability (in particular, light fastness and ozone resistance) and superior rubbing resistance; and which enables high quality printing at high density, has not yet been provided.

SUMMARY OF THE INVENTION

The present invention was made in view of the above circumstances and provides (1) a fine particle dispersion that is easy to handle and has low odor-generating and high safety properties, wherein the particle size of the dispersion particles is small and the dispersion has superior dispersion stability and storage stability, and which is suitable for use in an ink-jet recording ink, an aqueous ink for writing, an aqueous printing ink, an ink for information recording, and the like, (2) an ink for thermal, piezoelectric, electrolytic or acoustic ink-jet recording, which uses the fine particle dispersion, which is free from clogging at the end of a nozzle and has superior discharge stability, which has superior coloration and tone (hue) regardless of the type of paper used, which has superior ink permeability even when using the photo quality paper mentioned above, which has superior water resistance after printing, particularly superior image preservability (in particular, light fastness and ozone resistance) and superior rubbing resistance, and which enables high quality printing at high density, and (3) an ink-jet recording method using the ink.

In view of these circumstances, the inventors found that the problems described above can be solved by a fine particle dispersion wherein fine particles comprising an oil-soluble dye having an oxidation potential higher than 1.0 V vs SCE and a polymer having at least one of an amide group, a glycidyl group and a hydroxyl group are dispersed in an aqueous medium.

That is, a first aspect of the invention is to provide a fine particle dispersion, wherein fine particles comprising an oil-soluble dye having an oxidation potential higher than 1.0 V vs SCE and a polymer having at least one of an amide group, a glycidyl group and a hydroxyl group are dispersed in an aqueous medium.

A second aspect of the invention is to provide an ink composition comprising a fine particle dispersion, wherein fine particles comprising an oil-soluble dye having an oxidation potential higher than 1.0 V vs SCE and a polymer having at least one of an amide group, a glycidyl group and a hydroxyl group are dispersed in an aqueous medium.

A third aspect of the invention is to provide an ink-jet recording method comprising recording an image on a recording material using the ink composition according to the second aspect of the invention.

DETAILED DESCRIPTION OF THE INVENTION (Fine Particle Dispersion)

The fine particle dispersion of the present invention is a dispersion wherein fine particles comprising an oil-soluble dye having an oxidation potential higher than 1.0 V (vs SCE) and a polymer having at least one kind of group selected from an amide group, a glycidyl group and a hydroxyl group are dispersed in an aqueous medium. The fine particle dispersion may further include a hydrophobic high-boiling point organic solvent having a boiling point of 150° C. or higher. Specifically, the fine particle dispersion of the invention is a dispersion wherein the oil-soluble dye, the polymer and, if necessary, the hydrophobic high-boiling point organic solvent and other colorants are dispersed as oil droplets in a fine particle state (that is, in an emulsified and dispersed state) in the aqueous medium.

In the invention, the "aqueous medium" refers to water or a mixture of water and a small amount of a water-miscible organic solvent, to which additives are added if necessary.

—Dispersible Polymer—

The dispersible polymer used in the invention is a polymer having at least one kind of group selected from an amide group, a glycidyl group and a hydroxyl group. Specifically, the polymer preferably has at least one kind of group selected from the groups represented by the following formulae (1), (2) and (3):

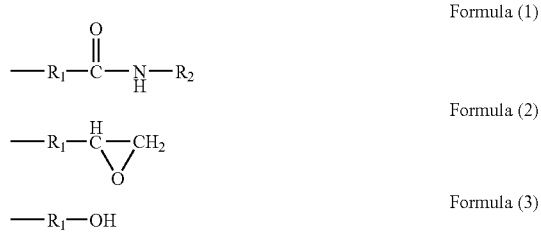

Formula (1)

Formula (2)

Formula (3)

In the formulae (1) to (3), each R1 each independently represents a straight-chain or branched-chain alkylene or alkyleneoxy group which may have a substituent, and $R^2$ represents a hydrogen atom, halogen atom, alkyl group, alkoxy group or cyano group.

Now, the formulae are described in detail.

The dispersible polymer used in the invention is preferably a polymer having a hydrophobic polymer moiety and a hydrophilic polymer moiety. The hydrophobic polymer moiety and the hydrophilic polymer moiety may be arbitrarily arranged in the dispersible polymer, but it is preferable that the hydrophilic polymer moiety is positioned at the terminal or at a side chain of the polymer; for example, a graft copolymer having a hydrophilic polymer moiety as a side chain thereof or a block copolymer having a hydrophilic polymer moiety at the terminal thereof. The dispersible polymer used in the invention may be any of the known polymer such as a vinyl polymer, a condensed polymer (polyurethane, polyester, polyamide, polyurea, polycarbonate) etc., among which the vinyl polymer whose structure can be easily regulated is preferable.

The hydrophobic polymer moiety is a polymer moiety such that when a polymer composed of a hydrophobic polymer moiety is prepared, the polymer is neither soluble nor degradable in water. The molecular weight (Mw) of the hydrophobic polymer moiety is preferably lower to improve ink permeability. That is, the Mw is preferably 10000 or less, more preferably 5000 or less.

Examples of the monomer which constitutes the hydrophobic polymer moiety include:

Acrylate esters or methacrylate esters (example of a terminal group of the ester linkage thereof include aliphatic groups which may have a substituent and aromatic groups which may have a substituent, and specific examples of such groups include a methyl group, ethyl group, n-propyl group, isopropyl group, n-butyl group, isobutyl group, sec-butyl group, tert-butyl group, amyl group, n-hexyl group, 2-ethylhexyl group, tert-octyl group, 2-chloroethyl group, 4-bromobutyl group, cyanoethyl group, cyclohexyl group, benzyl group, butoxymethyl group, 3-methoxybutyl group, 2-(2-methoxyethoxy)ethyl group, 2-(2-butoxyethoxy)ethyl group, 2,2,2-tetrafluoroethyl group, 1H,1H,2H,2H perfluorodecyl group, 4-butylphenyl group, phenyl group, 2,4,5-tetramethylphenyl group and 4-chlorophenyl group);

acrylamides and methacrylamides, specific examples thereof including N-mono-substituted acrylamide, N-di-substituted acrylamide, N-mono-substituted methacrylamide and N-di-substituted methacrylamide (examples of whose substituent include aliphatic groups which may have a substituent and aromatic groups which may have a substituent, and specific examples thereof include a methyl group, ethyl group, n-propyl group, isopropyl group, n-butyl group, isobutyl group, sec-butyl group, tert-butyl group, n-pentyl group, n-hexyl group, 2-ethylhexyl group, tert-octyl group, cyclohexyl group, benzyl group, alkoxymethyl group, alkoxyethyl group, 4-butylphenyl group, phenyl group, 2,4,5-tetramethylphenyl group and 4-chlorophenyl group);

glycidyl acrylates, glycidyl methacrylates, glycidylalkyl acrylates, and glycidylalkyl methacrylates, specific example thereof including glycidyl acrylate, glycidyl methacrylate, glycidylethyl acrylate, glycidylethyl methacrylate, glycidylpropyl acrylate, glycidylpropyl methacrylate;

hydroxyalkyl acrylates and hydroxyalkyl methacrylates, specific examples thereof including 2-hydroxyethyl acrylate, 2-hydroxyethyl methacrylate, 3-hydroxypropyl acrylate, 3-hydroxypropyl methacrylate, 4-hydroxybutyl acrylate, and 4-hydroxybutyl methacrylate;

olefins, specific examples thereof including dicyclopentadiene, ethylene, propylene, 1-butene, 1-pentene, vinyl chloride, vinylidene chloride, isoprene, chloroprene, butadiene and 2,3-dimethyl butadiene;

styrenes, specific examples thereof including styrene, 4-methyl styrene, dimethyl styrene, trimethyl styrene, 4-ethyl styrene, isopropyl styrene, 4-chloromethyl styrene, 4-methoxy styrene, 4-acetoxy styrene, 4-chlorostyrene, dichlorostyrene, 4-bromostyrene and methyl vinylbenzoate;

vinyl ethers, specific examples thereof including methyl vinyl ether, butyl vinyl ether, hexyl vinyl ether and methoxy vinyl ether; and other monomers, specific examples thereof including butyl crotonate, hexyl crotonate, dimethyl itaconate, dibutyl itaconate, diethyl maleate, dimethyl maleate, dibutyl maleate, diethyl fumarate, dimethyl fumarate, methyl vinyl ketone, phenyl vinyl ketone, methoxy ethyl vinyl ketone, N-vinyl oxazolidone, N-vinyl pyrrolidone, vinylidene chloride, methylene malonitrile, vinylidene, diphenyl-2-acryloyloxyethyl phosphate, diphenyl-2-methacryloyloxyethyl phosphate, dibutyl-2-acryloyloxyethyl phosphate and dioctyl-2-methacryloyloxyethyl phosphate.

Among these examples, preferable are acrylate esters and methacrylate esters wherein the terminal group of the ester linkage thereof is an unsubstituted aliphatic group, an alkyl-substituted aromatic group or an unsubstituted aromatic group, N-mono-substituted acrylamide, N-di-substituted acrylamide, N-mono-substituted methacrylamide and N-di-substituted methacrylamide wherein the substituent thereof is an unsubstituted aliphatic group, an alkyl-substituted phenyl group or a phenyl group, glycidyl acrylate, glycidyl methacrylate, 2-hydroxyethyl acrylate, and 2-hydroxyethyl methacrylate. More preferable are acrylates and methacrylates wherein the terminal group of the ester linkage thereof is an aliphatic group having 1 to 20 carbon atoms, an alkyl-substituted aromatic group having 7 to 30 carbon atoms or an unsubstituted aromatic group. Still more preferable are acrylates and methacrylates wherein the terminal group of the ester linkage thereof is an aliphatic group having 2 to 20 carbon atoms. Even more preferable are hexyl methacrylate, 2-ethylhexyl methacrylate, butyl acrylate, isobutyl acrylate, s-butyl acrylate, ethyl acrylate, propyl acrylate, hexyl acrylate and 2-ethylhexyl acrylate. Particularly preferable are n-hexyl methacrylate, n-butyl acrylate, isobutyl acrylate, s-butyl acrylate, propyl acrylate, and n-hexyl acrylate.

As far as the glass transition point (Tg) of the polymer becomes 30° C. or lower, the hydrophobic polymer moiety may be made of one constituent material, or may be made of two or more constituent materials for various purposes (for example, regulation of solubility, compatibility with the oil-soluble dye, stability of the dispersion, etc.).

The hydrophilic polymer moiety is a polymer moiety such that when a polymer composed of a hydrophilic polymer moiety is prepared, the polymer is soluble in water. This hydrophilic polymer moiety may be cationic, anionic and/or nonionic, preferably anionic and/or nonionic.

Examples of the cationic moiety include a polymer having a cationic dissociating group such as a tertiary amino group or pyridine group. Examples of the anionic polymer moiety include a polymer having an anionic dissociating group such as a carboxyl group or sulfo group. Examples of the nonionic polymer moiety include a polymer having a nonionic dispersible group such as an ethylene oxy group, hydroxyl group, or pyrrolidone group.

Examples of the monomer or polymer constituent unit which constitutes the hydrophilic polymer include monomers having an acid group such as a carboxyl group or sulfo group (such as acrylic acid, methacrylic acid, 2-acrylamide-2-methylpropane sulfonic acid and 2-carboxyethyl acrylate), acrylate esters and methacrylate esters having a hydrophilic substituent at the ester moiety thereof (examples of hydrophilic substituent include a hydroxyl group, carboxyl group, and amino group), acrylamide, methacrylamide, N-mono-substituted acrylamide, N-di-substituted acrylamide, N-mono-substituted methacrylamide, N-di-substituted methacrylamide, vinyl pyrrolidone, a polyethylene oxide moiety, a polyvinyl alcohol moiety, and a polyvalent alcohol moiety such as sugar and glycerin.

Among these, preferable are acrylic acids, methacrylic acids, 2-carboxyethyl acrylate, acrylate esters and methacrylate esters having a hydroxyl group (examples of hydroxyl-containing terminal group of the ester linkage thereof include 2-hydroxyethyl group and 2,3-dihydroxypropyl), acrylamide, N-mono-substituted acrylamide, N-di-substituted acrylamide, N-mono-substituted methacrylamide and N-di-substituted methacrylamide wherein the number of carbon atoms in total in substituent group(s) on the nitrogen atom is 1 to 4, a polyethylene oxide moiety, a polyvinyl alcohol moiety, and a polyvalent alcohol moiety such as sugar and glycerin. More preferable are acrylic acids, methacrylic acids, 2-carboxyethyl acrylate, 2-hydroxyethyl acrylate, 2-hydroxyethyl methacrylate, 2,3-dihydroxypropyl acrylate, 2,3-dihydroxypropyl methacrylate and 4-hydroxybutyl acrylate. Even more preferable are acrylic acid, methacrylic acid, 2-hydroxyethyl acrylate, 2,3-dihydroxypropyl acrylate, 4-hydroxybutyl acrylate, 2,3-dihydroxypropyl methacrylate, a polyethylene oxide moiety and a polyvinyl alcohol site. Even more preferably 2,3-dihydroxypropyl acrylate, 2,3-dihydroxypropyl methacrylate and a polyethylene oxide moiety.

As far as the hydrophilic polymer moiety functions as a hydrophilic site, the hydrophilic polymer moiety may be made of one constituent material, or may be made of two or more constituent materials for various purposes (regulation of the stability of the dispersion in various aqueous mediums, the solubility of the polymer in production of the dispersion, etc.).

The content of the hydrophobic polymer moiety and the hydrophilic polymer moiety in the dispersible polymer used in the invention can be arbitrarily decided depending on the properties of each moiety (for example, the degree of water-solubility of the hydrophilic polymer moiety and the degree of hydrophobicity of the hydrophobic polymer moiety), but it is preferable that the content of the hydrophobic polymer moiety is 60 to 85% by mass and the content of the hydrophilic polymer moiety is 10 to 40% by mass, in the dispersible polymer. It is more preferable that the content of the hydrophobic polymer moiety is 60 to 85% by mass and the content of the hydrophilic polymer moiety is 15 to 40% by mass, in the dispersible polymer. It is particularly preferable that the content of the hydrophobic polymer moiety is 60 to 80% by mass and the content of the hydrophilic polymer moiety is 20 to 40% by mass, in the dispersible polymer.

When the hydrophilic polymer moiety includes an anionic dissociating group, the content of the anionic dissociating group is preferably 0.1 to 3.0 mmol/g, more preferably 0.2 to 2.0 mmol/g. When the content of the dissociating group is low, the self-emulsifiability of the polymer is low, while when the content is high, the water solubility is increased to make the polymer unsuitable for dispersing the dye.

Moreover, when the dissociating group is an anionic dissociating group, it may be a salt of an alkali metal (for example, Na, K etc.) or an ammonium ion salt, and when the dissociable group is a cationic dissociable group, it may be a salt of an organic acid (for example, acetic acid, propionic acid, methanesulfonic acid) or an inorganic acid (hydrochloric acid, sulfuric acid etc.).

The weight-average molecular weight (Mw) of the dispersible polymer used in the invention is preferably 1000 to 200000, more preferably 2000 to 50000. If the molecular weight is lower than 1000, it may be difficult to obtain a stable fine particle dispersion. If the molecular weight is higher than 200000, the polymer tends to be poor in solubility in an organic solvent, or the viscosity of its solution in the organic solvent, tends to increase, thus making separation difficult.

The dispersible polymer used in the invention is a polymer having at least one selected from the group consisting of an amide group, a glycidyl group and a hydroxyl group. The content of the amide group in the dispersible polymer is preferably 1 to 100% by mass, more preferably 5 to 95% by mass, and still more preferably 10 to 90% by mass. The content of the glycidyl group in the dispersible polymer is preferably 1 to 100% by mass, more preferably 5 to 95% by mass, still more preferably 10 to 90% by mass. The content of the hydroxyl group in the dispersible polymer is preferably 1 to 90% by mass, more preferably 5 to 80% by mass, still more preferably 10 to 70% by mass.

The dispersible polymer used in the invention may be a homopolymer, a copolymer of two or more monomers, a blended mixture of polymers, or the like. As the content of the structural units (amide group, glycidyl group, hydroxyl group) in the polymer of the invention is increased, higher performance is exhibited.

Examples of the dispersible polymer used in the invention are listed below. The ratio in parentheses means ratio by mass. The invention is not limited to these examples.

PA-1) n-Butyl acrylate/t-butyl acrylamide copolymer (50:50) Mw=25900
PA-2) n-Hexyl methacrylate/t-butyl acrylamide copolymer (50:50) Mw=17800
PA-3) Isobutyl acrylate/t-butyl acrylamide copolymer (70:30) Mw=28300
PA-4) n-Butyl acrylate/glycidyl methacrylate copolymer (70:30) Mw=33000
PA-5) n-Hexyl methacrylate/glycidyl methacrylate copolymer (70:30) Mw=26700
PA-6) n-Butyl acrylate/glycidyl acrylate copolymer (70:30) Mw=35000
PA-7) n-Butyl acrylate/2-hydroxyethyl acrylate copolymer (70:30) Mw=
PA-8) n-Butyl acrylate/2-hydroxyethyl methacrylate copolymer (50:50) Mw=28200
PA-9) n-Butyl acrylate/t-butyl acrylamide/glycidyl methacrylate copolymer (30:50:20) Mw=19000
PA-10) n-Hexyl methacrylate/t-butyl acrylamide/glycidyl acrylate copolymer (30:50:20) Mw=22500
PA-11) n-Butyl acrylate/t-butyl acrylamide copolymer (70:30) Mw=31000
PA-12) n-Butyl acrylate/t-butyl acrylamide copolymer (80:20) Mw=30140
PA-13) n-Butyl acrylate/t-butyl acrylamide copolymer (90:10) Mw=30600
PA-14) n-Butyl acrylate/t-butyl acrylamide copolymer (30:70) Mw=36000
PA-15) n-Butyl acrylate/t-butyl acrylamide copolymer (20:80) Mw=38200
PA-16) n-Butyl acrylate/t-butyl acrylamide copolymer (10:90) Mw=36500
PA-17) n-Butyl acrylate/glycidyl methacrylate copolymer (80:20) Mw=32900
PA-18) n-Butyl acrylate/glycidyl methacrylate copolymer (90:10) Mw=33600
PA-19) n-Butyl acrylate/glycidyl methacrylate copolymer (50:50) Mw=31000
PA-20) n-Butyl acrylate/glycidyl methacrylate copolymer (30:70) Mw=28800
PA-21) n-Butyl acrylate/t-butyl acrylamide copolymer (50:50) and n-butyl acrylate/glycidyl acrylate copolymer (70:30) =1/1 blend
PA-22) n-Butyl acrylate/t-butyl acrylamide copolymer (50:50) and n-butyl acrylate/glycidyl acrylate copolymer (70:30)=2/1 blend
PA-23) n-Butyl acrylate/t-butyl acrylamide copolymer (50:50) and n-butyl acrylate/2-hydroxyethyl methacrylate copolymer (50:50)=1/1 blend
PA-24) n-Butyl acrylate/t-butyl acrylamide copolymer (50:50) and n-butyl acrylate/2-hydroxyethyl methacrylate copolymer (50:50)=3/1 blend
PA-25) n-Butyl acrylate/N-isopropyl acrylamide copolymer (70:30) Mw=4200
PA-26) n-Butyl acrylate/N-isopropyl acrylamide copolymer (50:50) Mw=6990

—Oil-soluble Dye—

The oil-soluble dye used in the invention refers to a dye substantially insoluble in water. Specifically, the solubility of the oil-soluble dye (mass of the dye soluble in 100 g of water) in water at 25° C. is 1 g or less, preferably 0.5 g or less, and still more preferably 0.1 g or less.

Accordingly, the oil-soluble dye refers to a water-insoluble, oil-soluble dye.

In order to improve resistance against fading particularly resistance against oxidizing substances such as ozone, or curing properties, the oxidation potential is desirably high. Therefore, the oxidation potential of the oil-soluble dye used in the invention should be higher than 1.0 V (vs SCE). The oxidation potential is preferably high. The oxidation potential is more preferably higher than 1.1 V (vs SCE), and still more preferably higher than 1.15 V (vs SCE).

The oxidation potential is described in paragraphs 0049 to 0051 in JP-A No. 2002-309118.

The melting point of the oil-soluble dye is preferably 200° C. or lower, more preferably 150° C. or lower, and still more preferably 100° C. or lower. By using the oil-soluble dye having a low melting point, the dye in the ink composition can be prevented from being precipitated as crystals, thus improving the storage stability of the ink composition.

In the ink composition of the invention, the oil-soluble dye may be used alone, or in a mixture of two or more thereof. If necessary, the ink composition of the invention may contain different colorants such as a water-soluble dye, a disperse dye and a pigment in such a range that the effect of the invention is not hindered.

As the oil-soluble dye, conventionally known compounds (dyes) can be used. Specifically, dyes described in paragraphs 0023 to 0053 in JP-A No. 2002-114930 can be mentioned.

The yellow oil-soluble dye used in the invention is preferably an oil-soluble dye having a structure represented by formula (Y-I) below. The oil-soluble dye of the formula Y-I) may be used not only in yellow ink but also in inks of any colors such as black ink, green ink and red ink.

A—N=N—B            Formula (Y-I)

In the formula (Y-I), A and B each independently represent a heterocyclic group which may have a substituent. The heterocyclic ring is preferably a heterocyclic ring composed of 5- or 6-memberred ring(s), and may be a monocyclic structure or a polycyclic structure having two or more rings condensed therein. The heterocyclic ring may be an aromatic heterocyclic ring or a non-aromatic heterocyclic ring. The heteroatom contained in the heterocyclic ring is preferably a nitrogen atom, an oxygen atom or a sulfur atom.

The heterocyclic ring represented by A is preferably 5-pyrazolone, pyrazole, oxazolone, isoxazolone, barbituric acid, pyridone, rhodanine, pyrazolidinedion, prazolopyridone, merdrumic acid, or a condensed heterocyclic ring wherein a hydrocarbon aromatic ring or heterocyclic ring is ring-condensed to these heterocyclic rings. Among these, more preferable are 5-pyrazolone, 5-aminopyrazole, pyridone, and pyrazoloazoles, and even more preferable are 5-aminopyrazole, 2-hydroxy-6-pyridone and pyrazoloazole.

Preferable examples of the heterocyclic ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzoisothiazole, thiadiazole, benzoisoxazole, pyrrolidine, piperidine, piperazine, imidazolidine and thiazoline. Among these, pyridine, quinoline, thiophene, benzothiophene, pyrazole, imidazole, benzimidazole, triazole, oxazole, isoxazole, benzoxazole, thiazole, benzothiazole, isothiazole, benzoisothiazole, thiadiazole, and benzoisoxazole are preferable, quinoline, thiophene, pyrazole, thiazole, benzoxazole, benzoisoxazole, isothiazole, imidazole, benzothiazole and thiadiazole are more preferable, and pyrazole, benzothiazole, benzoxazole, imidazole, 1,2,4-thiadiazole and 1,3,4-thiadiazole are particularly preferable.

Examples of the substituent whcih the above-mentioned A and B may have include a halogen atom, alkyl group, cycloalkyl group, aralkyl group, alkenyl group, alkynyl group, aryl group, heterocyclic group, cyano group, hydroxyl group, nitro group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group and silyl group.

Among the dyes represented by the above formula (Y-I), dyes represented by the following formulae (Y-II), (Y-III) and (Y-IV) are more preferable.

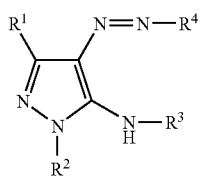

Formula (Y-II)

In the formula (Y-II), $R^1$ and $R^3$ each independently represent a hydrogen atom, cyano group, alkyl group, cycloalkyl group, aralkyl group, alkoxy group, alkylthio group, arylthio group, aryl group or ionic hydrophilic group. $R^2$ represents a hydrogen atom, alkyl group, cycloalkyl group, aralkyl group, carbamoyl group, acyl group, aryl group or heterocyclic group. $R^4$ represents a heterocyclic group.

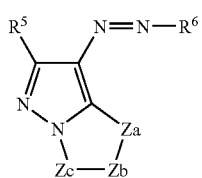

Formula (Y-III)

In the formula (Y-III), $R^5$ represents a hydrogen atom, cyano group, alkyl group, cycloalkyl group, aralkyl group, alkoxy group, alkylthio group, arylthio group, aryl group or ionic hydrophilic group. Za represents —N=, —NH—, or $C(R^{11})$. Zb and Zc each independently represent —N= or $C(R^{11})$=, and $R^{11}$ represents a hydrogen atom or a nonmetallic substituent group. $R^6$ represents a heterocyclic group.

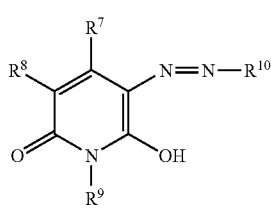

Formula (Y-IV)

In the formula (Y-IV), $R^7$ and $R^9$ each independently represent a hydrogen atom, cyano group, alkyl group, cycloalkyl group, aralkyl group, aryl group, alkylthio group, arylthio group, alkoxycarbonyl group, carbamoyl group or ionic hydrophilic group. $R^8$ represents a hydrogen atom, halogen atom, alkyl group, alkoxy group, aryl group, aryloxy group, cyano group, acylamino group, sulfonylamino group, alkoxycarbonylamino group, ureido group, alkylthio group, arylthio group, alkoxycarbonyl group, carbamoyl group, sulfamoyl group, sulfonyl group, acyl group, alkylamino group, arylamino group, hydroxy group or ionic hydrophilic group. $R^{10}$ represents a heterocyclic group.

The substituents represented by $R^1$, $R^2$, $R^3$, $R^5$, $R^7$, $R^8$ and $R^9$ in the formulae (Y-II), (Y-III) and (Y-IV) are described in detail below.

The alkyl group represented by $R^1$, $R^2$, $R^3$, $R^5$, $R^7$, $R^8$ and $R^9$ includes an alkyl group having a substituent and an unsubstituted alkyl group.

The alkyl group is preferably an alkyl group having 1 to 20 carbon atoms, and examples of the substituent include a hydroxyl group, alkoxy group, cyano group, halogen atom and ionic hydrophilic group.

Preferable examples of the (substituted) alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by $R^1$, $R^2$, $R^3$, $R^5$, $R^7$, $R^8$ and $R^9$ includes a cycloalkyl group having a substituent and an unsubstituted cycloalkyl group.

The cycloalkyl group is preferably a cycloalkyl group having 5 to 20 carbon atoms, and examples of the substituent include an ionic hydrophilic group.

Preferably, the cycloalkyl group is, for example, cyclohexyl.

The aralkyl group represented by $R^1$, $R^2$, $R^3$, $R^5$, $R^7$, $R^8$ and $R^9$ includes an aralkyl group having a substituent and an unsubstituted aralkyl group.

The aralkyl group is preferably an aralkyl group having 7 to 20 carbon atoms, and examples of the substituent include an ionic hydrophilic group.

The aralkyl group is preferably benzyl or 2-phenethyl.

The aryl group represented by $R^1$, $R^2$, $R^3$, $R^5$, $R^7$, $R^8$ and $R^9$ includes an aryl group having a substituent and an unsubstituted aryl group.

The aryl group is preferably an aryl group having 6 to 20 carbon atoms, and examples of the substituent include an alkyl group, alkoxy group, halogen atom, alkylamino group and ionic hydrophilic group.

Preferable examples of the (substituted) aryl group include phenyl, p-tolyl, p-methoxyphenyl, o-chlorophenyl and m-(3-sulfopropylamino) phenyl.

The alkylthio group represented by $R^1$, $R^2$, $R^3$, $R^5$, $R^7$, $R^8$ and $R^9$ includes an alkylthio group having a substituent and an unsubstituted alkylthio group.

The alkylthio group is preferably an alkylthio group having 1 to 20 carbon atoms, and examples of the substituent include an ionic hydrophilic group.

The alkylthio group is preferably a methylthio group or an ethylthio group.

The arylthio group represented by $R^1$, $R^2$, $R^3$, $R^5$, $R^7$, $R^8$ and $R^9$ includes an arylthio group having a substituent and an unsubstituted arylthio group.

The arylthio group is preferably an arylthio group having 6 to 20 carbon atoms, and examples of the substituent include an alkyl group and an ionic hydrophilic group.

The arylthio group is preferably, for example, a phenylthio group or p-tolylthio group.

The heterocyclic group represented by $R^2$ is preferably a 5- or 6-memberred heterocyclic ring, and such hetrocyclic rings may be further ring-condensed. The heteroatom contained in the heterocyclic ring is preferably a nitrogen atom, sulfur atom or oxygen atom. The heterocyclic ring may be an aromatic or a non-aromatic heterocyclic ring. The heterocyclic ring may further have a substituent, and preferable examples of the substituent include the same substituent groups as on the aryl group described above. The heterocycle is preferably a 6-memberred nitrogen-containing aromatic heterocycle, particularly preferably triazine, pyrimidine or phthalazine.

Preferable examples of the halogen atom represented by $R^8$ include a fluorine atom, chlorine atom and bromine atom.

The alkoxy group represented by $R^1$, $R^3$, $R^5$ and $R^8$ includes an alkoxy group having a substituent and an unsubstituted alkoxy group.

The alkoxy group is preferably an alkoxy group having 1 to 20 carbon atoms, and examples of the substituent include a hydroxyl group and ionic hydrophilic group.

Preferable examples of the (substituted) alkoxy group include methoxy, ethoxy, isopropoxy, methoxyethoxy, hydroxyethoxy, and 3-carboxypropoxy.

The aryloxy group represented by $R^8$ includes an aryloxy group having a substituent and an unsubstituted aryloxy group.

The aryloxy group is preferably an aryloxy group having 6 to 20 carbon atoms, and examples of the substituent include an alkoxy group and ionic hydrophilic group.

Preferable examples of the (substituted) aryloxy group include phenoxy, p-methoxyphenoxy and o-methoxyphenoxy.

The acylamino group represented by $R^8$ includes an acylamino group having a substituent and an unsubstituted acylamino group.

The acylamino group is preferably an acylamino group having 2 to 20 carbon atoms, and examples of the substituent include an ionic hydrophilic group.

Preferable examples of the acylamino group include acetamide, propionamide, benzamide and 3,5-disulfobenzamide.

The sulfonylamino group represented by $R^8$ includes a sulfonylamino group having a substituent and an unsubstituted sulfonylamino group.

The sulfonylamino group is preferably a sulfonylamino group having 1 to 20 carbon atoms.

Preferable examples of the sulfonylamino group include methylsulfonylamino and ethylsulfonylamino.

The alkoxycarbonylamino group represented by $R^8$ includes an alkoxycarbonylamino group having a substituent and an unsubstituted alkoxycarbonylamino group.

The alkoxycarbonylamino group is preferably an alkoxycarbonylamino group having 2 to 20 carbon atoms, and examples of the substituent include an ionic hydrophilic group.

Preferable examples of the alkoxycarbonylamino group include ethoxycarbonylamino.

The ureido group represented by $R^8$ includes an ureido group having a substituent and an unsubstituted ureido group.

The ureido group is preferably an ureido group having 1 to 20 carbon atoms, and examples of the substituent include an alkyl group and aryl group.

Preferable examples of the (substituted) ureido group include 3-methylureido, 3,3-dimethylureido and 3-phenylureido.

The alkoxycarbonyl group represented by $R^7$, $R^8$ and $R^9$ includes an alkoxycarbonyl group having a substituent and an unsubstituted alkoxycarbonyl group.

The alkoxycarbonyl group is preferably an alkoxycarbonyl group having 2 to 20 carbon atoms, and examples of the substituent include an ionic hydrophilic group.

Preferable examples of the alkoxycarbonyl group include methoxycarbonyl and ethoxycarbonyl.

The carbamoyl group represented by $R^2$, $R^7$, $R^8$ and $R^9$ includes a carbamoyl group having a substituent and an unsubstituted carbamoyl group. Examples of the substituent include an alkyl group.

Preferable examples of the (substituted) carbamoyl group include a methylcarbamoyl group and dimethylcarbamoyl group.

The sulfamoyl group represented by $R^8$ includes a sulfamoyl group having a substituent and an unsubstituted sulfamoyl group. Examples of the substituent include an alkyl group.

Preferable examples of the (substituted) sulfamoyl group include a dimethylsulfamoyl group and di-(2-hydroxyethyl) sulfamoyl group.

Preferable examples of the sulfonyl group represented by $R^8$ include methanesulfonyl and phenylsulfonyl.

The acyl group represented by $R^2$ and $R^8$ includes an acyl group having a substituent and an unsubstituted acyl group. The acyl group is preferably an acyl group having 1 to 20 carbon atoms, and examples of the substituent include an ionic hydrophilic group.

Preferable examples of the acyl group include acetyl and benzoyl.

The amino group represented by $R^8$ includes an amino group having a substituent and an unsubstituted amino group. Examples of the substituent include an alkyl group, aryl group and heterocyclic group.

Preferable examples of the (substituted) amino group include methylamino, diethylamino, anilino and 2-chloroanilino.

The heterocyclic group represented by $R^4$, $R^6$ and $R^{10}$ is identical with the heterocyclic group which may have a substituent represented by B in the formula (Y-I) above, and preferable examples, more preferable examples and still more preferable examples thereof are identical with those described above.

Examples of the substituent include an ionic hydrophilic group, alkyl group having 1 to 12 carbon atoms, aryl group, alkylthio group, arylthio group, halogen atom, cyano group, sulfamoyl group, sulfonamino group, carbamoyl group, and acylamino group. The alkyl group and the aryl group may further have a substituent.

In the formula (Y-III) above, Za represents —N=, —NH—, or $C(R^{11})=$. Zb and Zc each independently represent —N= or $C(R^{11})=$. $R^{11}$ represents a hydrogen atom or a nonmetallic substituent. The nonmetallic substituent represented by $R^{11}$ is preferably a cyano group, cycloalkyl group, aralkyl group, aryl group, alkylthio group, arylthio group or ionic hydrophilic group. Each substituent has the same meanings, as each of the substituents represented by $R^1$, and preferable examples thereof are also identical with those described above. Examples of the skeleton of the heterocyclic ring composed of two 5-memberred rings contained in the formula (Y-III) above are shown below.

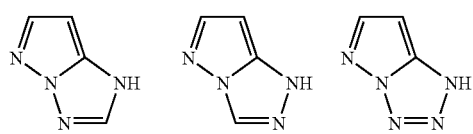

Regarding the substituents which may further have a substituent, examples of the substituent include the substituent which may be present on the heterocyclic rings A and B in the formula (Y-I).

Examples (Y-101 to Y-155) of dyes represented by the formula (Y-I) are shown in paragraphs 0139 to 0149 in JP-A No. 2003-073598, but the dye used in the invention is not limited to these specific examples described above. These compounds can be synthesized with reference to Nos. JP-A 2-24191 and JP-A 2001-279145.

The magenta dye is preferably a compound having a structure represented by formulae (3) and (4) in JP-A No. 2002-114930, and the specific examples include compounds in paragraphs 0054 to 0073 in JP-A No. 2002-114930.

Particularly preferable example are azo dyes represented by formulae (M-1) to (M-2) shown in paragraphs 0084 to 0122 in JP-A No. 2002-121414, and specific examples thereof include compounds described in paragraphs 0123 to 0132 in JP-A No. 2002-121414. The oil-soluble dyes of the formulae (3), (4) and (M-1) to (M-2) shown in the publication may be used not only in a magenta ink but also in inks of any colors such as black ink and red ink.

Preferable examples of the cyan dyes include dyes represented by formulae (I) to (IV) in JP-A No. 2001-181547 and dyes represented by formulae (IV-1) to (IV-4) shown in paragraphs 0063 to 0078 in No. JP-A No. 2002-121414. Specific examples thereof include compounds in paragraphs 0052 to 0066 in JP-A No. 2001-181547 and paragraphs 0079 to 0081 in JP-A No. 2002-121414.

Particularly preferable examples of the dye include phthalocyanine dyes represented by formulae (C-I) and (C-II) shown in paragraphs 0133 to 0196 in JP-A No. 2002-121414, more preferably phthalocyanine dyes represented by the formula (C-II). Specific examples include compounds in paragraphs 0198 to 0201 in JP-A No. 2002-121414. The oil-soluble dyes of the formulae (I) to (IV), (IV-1) to (IV-4), (C-I) and (C-II) may be used not only in a cyan ink but also in inks of any colors such as black ink and green ink.

The oil-soluble dye is preferably present in a dissolved state in fine particles, and is preferably free from crystalline precipitation with time. That is, it is important that the oil-soluble dye is highly compatible with the dispersible polymer, particularly with its hydrophobic moiety.

The content of the oil-soluble dye in the fine particle dispersion is preferably 0.05 to 15% by mass, more preferably 0.1 to 10% by mass, and still more preferably 0.2 to 6% by mass.

—Production of the Fine Particle Dispersion—

The fine particle dispersion of the invention can be produced by dispersing the oil-soluble dye having an oxidation potential higher than 1.0 V vs SCE and the dispersible polymer including the specific structural moieties, in the form of fine particles, in an aqueous medium (liquid containing at least water). Specific examples thereof include a method of preparing a latex of the dispersible polymer beforehand and impregnating the latex with the oil-soluble dye, and a co-emulsification dispersion method.

Among these methods, the co-emulsification dispersion method is preferable. The co-emulsification dispersion method is preferably a method wherein water is added to an organic solvent containing the dispersible polymer and the oil-soluble dye, or the organic solvent is added to water, to emulsify the organic solvent thereby forming fine particles.

The latex refers to a material wherein the dispersible polymer insoluble in an aqueous medium is dispersed as fine particles in the aqueous medium. The dispersed state may be a state where the dispersible polymer is emulsified in an aqueous medium, is emulsion-polymerized or is emulsified as micelles, or a state where the dispersible polymer has a partially hydrophilic structure in the molecule to disperse its molecular chain dispersed in a molecular state.

First, the method of preparing the polymer latex beforehand and impregnating the polymer latex with the oil-soluble dye is described.

A first example of this method includes a first process of preparing a polymer latex, a second process of preparing a colorant-containing liquid having the oil-soluble dye dispersed or dissolved in an organic solvent, and a third process of preparing a fine particle dispersion by mixing the colorant-containing liquid with the polymer latex.

A second example of this method includes a first process of preparing a polymer latex, a second process of preparing a fine colorant particle dispersed liquid by preparing a colorant-containing liquid having the oil-soluble dye dispersed or dissolved in an organic solvent and mixing the colorant-containing liquid with a liquid containing at least water, and a third process of preparing a fine particle dispersion by mixing the polymer latex with the fine colorant particle dispersed liquid.

A third example of this method includes a method described in JP-A No. 55-139471.

Then, the co-emulsification dispersion method is described in detail.

A first example of this method includes a first process of preparing a polymer/colorant mixed liquid having the oil-soluble dye and the dispersible polymer dispersed or dissolved in an organic solvent and a second process of preparing fine particle dispersion by mixing the resultant polymer/colorant mixed liquid with a liquid containing at least water.

A second example of this method includes a first process of preparing a colorant-containing liquid having the oil-soluble dye dispersed or dissolved in an organic solvent, a second process of preparing a polymer solution having the dispersible polymer dispersed or dissolved in an organic solvent, and a third process of preparing a fine particle dispersion by mixing the colorant-containing liquid, the polymer solution and a liquid containing at least water.

A third example of this method includes a first process of preparing a fine colorant particle dispersed liquid by preparing a colorant-containing liquid having the oil-soluble dye dispersed or dissolved in an organic solvent and mixing the colorant-containing liquid with a liquid containing at least water, a second process of preparing a fine polymer particle dispersed liquid by preparing a polymer solution having the dispersible polymer dispersed or dissolved in an organic solvent and mixing the polymer solution with a liquid containing at least water, and a third process of preparing a fine particle dispersion by mixing the fine colorant particle dispersed liquid with the fine polymer particle dispersed liquid.

A fourth example of this method includes a first process of preparing a fine colorant particle dispersed liquid by preparing a colorant-containing liquid having the oil-soluble dye dispersed or dissolved in an organic solvent and mixing the colorant-containing liquid with a liquid containing at least water, a second process of preparing a polymer solution having the dispersible polymer dispersed or dissolved in an organic solvent, and a third process of preparing a fine particle dispersion by mixing the fine colorant particle dispersed liquid with the polymer solution.

A fifth example of this method is a process of directly preparing the fine particle dispersion by mixing a liquid containing at least water with the oil-soluble dye and the dispersible polymer.

The amount of the dispersible polymer used in the fine particle dispersion of the invention is preferably 10 to 1000 parts by mass, and more preferably 50 to 600 parts by mass, per 100 parts by mass of the oil-soluble dye. If the amount of the polymer used is lower than 10 parts by mass, it may be difficult that the fine particles are finely and stably dispersed, while if the amount is higher than 1000 parts by mass, the ratio of the oil-soluble dye in the fine particle dispersion becomes small, and in application of the fine particle dispersion to an aqueous ink, there is no or less allowance in formulation design.

The content of the fine particles in the fine particle dispersion is preferably 1 to 45% by mass, more preferably 2 to 30% by mass. The content can be suitably regulated by dilution, evaporation, ultrafiltration, or the like.

The average particle size of the fine particles is preferably 1 to 500 nm, more preferably 3 to 300 nm, and still more preferably 3 to 200 nm. The particle size distribution is not particularly limited, and may be a broad particle distribution or a monodisperse particle size distribution. The particle size and the particle size distribution can be regulated by means such as centrifugation, filtration etc.

—Organic Solvent—

The organic solvent used in production of the fine particle dispersion of the invention is not particularly limited, and can be selected suitably depending on the solubility of the oil-soluble dye and dispersible polymer, and examples of such organic solvent include ketone solvents such as acetone, methyl ethyl ketone and diethyl ketone, alcohol solvents such as methanol, ethanol, 2-propanol, 1-propanol, 1-butanol and tert-butanol, chlorine-based solvents such as chloroform and methylene chloride, aromatic solvents such as benzene and toluene, ester solvents such as ethyl acetate, butyl acetate and isopropyl acetate, ether solvents such as diethyl ether, tetrahydrofuran and dioxane, and glycol ether solvents such as ethylene glycol monomethyl ether and ethylene glycol dimethyl ether.

The organic solvents may be used alone or as a mixture of two or more thereof. Depending on the solubility of the dye and the polymer, the organic solvent may be a mixed solvent with water.

Although the amount of the organic solvent used is not particularly limited as far as the effect of the invention is not hindered, the amount is preferably 10 to 2000 parts by mass, more preferably 100 to 1000 parts by mass, per 100 parts by mass of the dispersible polymer.

If the amount of the organic solvent used is lower than 10 parts by mass, it may be difficult that the fine particles are finely and stably dispersed. If the amount is higher than 2000 parts by mass, the process of removing the organic solvent and the process of concentrating the solution are essential and, the process for producing the fine particles dispersion becomes complicated. Furthermore, there may be no or less allowance in formulation design.

When the vapor pressure of the organic solvent is higher than that of water, the organic solvent is preferably removed from the viewpoint of the stability of the fine particle dispersion, safety and health. The method of removing the organic solvent can make a wide variety of known methods depending on the type of solvent. Such methods include a vaporization method, vacuum vaporization method, and ultrafiltration method. The process of removing the organic solvent is preferably conducted as soon as possible after emulsification.

—Additives—

The fine particle dispersion of the invention may contain additives selected depending on purposes, in such a range that the effect of the invention is not hindered.

Examples of the additive include a neutralizing agent, a hydrophobic high-boiling point organic solvent, a dispersant, a dispersion stabilizer, and the like.

When the dispersible polymer has an unneutralized dissociating group, the neutralizing agent can be used preferably from the viewpoint of adjusting the pH of the fine particle dispersion, regulating self-emulsifiability, conferring dispersion stability, or the like Examples of the neutralizing agent include an organic base and an inorganic alkali.

Examples of the organic base include triethanol amine, diethanol amine, N-methyl diethanol amine, dimethylethanol amine.

Examples of the inorganic alkali includes alkali metal hydroxides (for example, sodium hydroxide, lithium hydroxide, potassium hydroxide etc.), carbonates (for example, sodium carbonate, sodium hydrogen carbonate etc.), and ammonia.

The neutralizing agent is added to the fine particle dispersion to adjust its pH to preferably pH 4.5 to 10.0, more preferably pH 6.0 to 10.0, from the viewpoint of improving the dispersion stability.

The hydrophobic high-boiling point organic solvent is used to regulate the viscosity, specific gravity, and printing performance of the fine particle dispersion. The hydrophobic high-boiling point organic solvent is a hydrophobic solvent having a boiling point of preferably 150° C. or higher, and more preferably 170° C. or higher. With the term "hydrophobic" given, the solubility of the solvent in distilled water at 25° C. is 3% or less. The dielectric constant of the hydrophobic high-boiling point organic solvent is preferably 3 to 12, and more preferably 4 to 10. The dielectric constant refers to dielectric constant relative to vacuum at 25° C. As the hydrophobic high-boiling point organic solvent, compounds described in U.S. Pat. No. 2,322,027 and JP-A No. 3-276508 can be used. Specific examples include phosphoric triesters, phthalic diesters, alkyl naphthalene, benzoates etc. These can be used in a liquid or solid form at ambient temperatures, depending on purposes.

Although the amount of the high-boiling point organic solvent is not particularly limited as far as the effect of the invention is not hindered, the amount is preferably 0 to 1000 parts by mass, more preferably 0 to 300 parts by mass, per 100 parts by mass of the dispersible polymer.

The dispersant and/or the dispersion stabilizer may be added to any of the polymer latex, the colorant-containing liquid, the polymer/colorant mixed liquid, the fine colorant particle dispersed liquid, the polymer solution, and the liquid containing at least water, but is added preferably to the colorant-containing liquid and the water-containing liquid before the process of preparing the polymer latex and/or the fine colorant particle dispersed liquid.

Examples of the dispersion and the dispersion stabilizer include various surfactants such as cationic, anionic and nonionic surfactants, water-soluble or water-dispersible low-molecular compounds, oligomers etc. The amount of the dispersant and dispersion stabilizer added is 0 to 100% by mass, preferably 0 to 20% by mass, relative to the total amount of the oil-soluble dye and the dispersible polymer.

Particularly, the dispersant is preferably a nonionic surfactant, and examples thereof include polyoxyethylene sorbitan fatty acid esters, sorbitan fatty acid esters, polyoxyethylene alkyl ethers, polyoxyethylene alkyl phenyl ethers, polyoxyethylene derivatives, and oxyethylene/oxypropylene block copolymers.

The amount of the nonionic surfactant used is preferably 0.01 to 1.0 parts by weight, more preferably 0.01 to 0.5 parts by weight, relative to the oil-soluble dye.

The anionic surfactant may be used in combination with the nonionic surfactant, in an amount of 0.01 to 0.5 parts by weight relative to the oil-soluble dye.

—Applications of the Fine Particle Dispersion—

The fine particle dispersion of the invention can be used in various fields and is preferable in an aqueous ink for writing, an aqueous ink for printing, an ink for information recording etc., and can be used particularly preferably in the ink-jet ink according to the invention described below.

When the fine particle dispersion is used in an aqueous ink for writing, an aqueous ink for printing, an ink for information recording etc., a recording material is not limited, and may be a known material. Examples include plane paper, resin-coated paper, paper for ink-jet printing, film, paper which can also be used for electrophotography, clothing, glass, metal, ceramic ware etc.

(Ink-Jet Ink, Ink-Jet Recording Method, and Recording Material)

The ink-jet ink (ink composition) according to the invention contains the fine particle dispersion of the invention, and further contains other additives selected suitably and as necessary. The other additives include known additives such as a drying inhibitor, a permeation accelerator, an antioxidant, an anti-fungus agent, a pH adjusting agent, a surface tension regulator, a defoaming agent, a viscosity regulator, a dispersant, a dispersion stabilizer, a rust preventive, a chelating agent etc., and those described in paragraphs 0217 to 0226 in JP-A No. 2001-279141 can be used.

As the ink-jet recording ink according to the invention, the ink described in paragraph 0247 in JP-A No. 2001-279141 can be used.

—Other Additives—

A water-soluble organic solvent, a surface tension regulator, a viscosity regulator, a dispersant, a dispersion stabilizer, an antioxidant, an anti-fungus agent, a rust preventive, a pH regulating agent, a defoaming agent, a chelating agent, a UV absorber etc. can be suitably selected as additives and used in a suitable amount. These additives are described in, for example, JP-A No. 2001-181549.

The water-soluble organic solvent is used as a drying inhibitor or a permeation accelerator. The water-soluble organic solvent is preferably a water-soluble organic solvent having a vapor pressure lower than that of water. Specific examples include polyvalent alcohols such as ethylene glycol, propylene glycol, diethylene glycol, polyethylene glycol, thiodiglycol, dithiodiglycol, 2-methyl-1,3-propanediol, 1,2,6-hexanetriol, glycerin, trimethylol propane and diethanol amine, substituted or unsubstituted fatty monovalent alcohols such as amyl alcohol, furfuryl alcohol, diacetone alcohol, ethylene glycol monoethyl ether, diethylene glycol monomethyl ether and triethylene glycol monoethyl ether, heterocyclic compounds such as 2-pyrrolidone, N-methyl-2-pyrrolidone, 1,3-dimethyl-2-imidazolidinone and N-ethylmorpholine, and sulfur-containing compounds such as sulfolane, dimethyl sulfoxide and 3-sulfolene.

Among these, the polyvalent alcohols and substituted or unsubstituted fatty monovalent alcohols are preferable, and polyvalent alcohols such as glycerin and diethylene glycol are more preferable. The water-soluble organic solvents may be used alone or as a mixture of two or more thereof.

These water-soluble organic solvents are contained in an amount of preferably 5 to 60% by mass, more preferably 7 to 50% by mass, and still more preferably 10 to 40% by mass, in the ink.

Examples of the surface tension regulator include nonionic, cationic or anionic surfactants. Examples of the anionic surfactant include, for example, fatty acid salts, alkyl sulfates, alkylaryl sulfonates (for example, alkyl benzene sulfonates, petroleum sulfonates etc.), dialkyl sulfosuccinates, alkyl phosphates, naphthalene sulfonic acid/formalin condensates, polyoxyethylene alkyl sulfates etc. Examples of the nonionic surfactant includes acetylene diols (for example, 2,4,7,9-tetramethyl-5-decyn-4,7-diol etc.), polyoxyethylene alkyl ethers (for example, polyoxyethylene decyl ether, acetylene diol/ethylene oxide adduct etc.), polyoxyethylene fatty acid esters, sorbitan fatty acid esters, polyoxyethylene sorbitan fatty acid esters, polyoxyethylene alkyl amines, glycerin fatty acid esters, oxyethylene oxypropylene block copolymer etc.

Amine oxide-based amphoteric surfactants such as N,N-dimethyl-N-alkyl amine oxide are also preferable. Surfactants described on pages 37 to 38 in JP-A No. 59-157,636 and in Research Disclosure No. 308119 (1989) can also be used.

An anionic surfactant having a hydrophobic moiety of two chains or a branched hydrophobic moiety, an anionic surfactant having a hydrophilic group near the center of a hydrophobic moiety, a nonionic surfactant having a hydrophobic moiety of 2 chains or a branched hydrophobic moiety (for example, 2-butyloctanoic acid/polyethylene oxide esterified at one terminal, undecane-6-ol/polyethylene oxide adduct etc.) and a nonionic surfactant having a hydrophilic group near the center of a hydrophobic moiety (for example, acetylene diol/ethylene oxide adducts (SURFYNOLS series (Air Products & Chemicals)) etc.) are preferable since precipitation or separation from ink is not easily caused, and the forming properties is small. Among these, preferable are those having a molecular weight of 200 to 1000, more preferably 300 to 900, and still more preferably 400 to 900.

The surface tension of the ink of the invention is preferably 20 to 60 mN/m, and more preferably 25 to 45 mN/m, in the presence or absence of the surfactant. The dynamic surface tension is preferably 20 to 40 mN/m, and more preferably 25 to 35 mN/m, in the presence or absence of the surfactant.

The viscosity of the ink of the invention is preferably 30 mPa·s or less. The viscosity is further preferably adjusted to 20 mPa·s or less, and a viscosity regulator may be used for the purpose of regulating the viscosity. Examples of the viscosity regulator include water-soluble polymers such as cellulose and derivatives thereof and polyvinyl alcohols.

Additives such as a dispersant, a dispersion stabilizer, an antioxidant, an anti-fungus agent, a rust preventive, a pH adjusting agent, a defoaming agent, a chelating agent and an UV absorber may be the known additives described in JP-A No. 2001-181549.

The ink of the invention preferably contains at least one compound selected from the group consisting of alcohols, polyvalent alcohols and water-soluble glycol ethers.

—Ink-jet Recording Method—

The ink-jet recording method of the invention includes recording an image on a recording material with the ink (ink composition) according to the invention.

—Recording Material—

The recording material used in the ink-jet recording method using the ink according to the invention includes plane paper, coated paper, plastic film etc. Recording materials including an inorganic fine particle-containing porous ink receiving layer described in JP-A No. 2001-181549 and in paragraphs 0228 to 0246 in JP-A No. 2001-279141 are preferable. The recording material is preferably recording paper.

EXAMPLES

Hereinafter, the present invention is described in more detail by reference to the Examples, but the invention is not limited to the Examples. In the Examples, the terms "parts" and "%" refer to "parts by "mass" and "% by mass" respectively unless otherwise specified.

Example 1

Production Example 1

Preparation of Fine Particle Dispersion (A-1)

A mixture of 16 parts of ethyl acetate, 2.7 parts of dispersible polymer (PA-1) Mw=25900 (solids content 50%) and 0.45 parts of oil-soluble dye (M-1) below (oxidation potential 1.39 V) was prepared. Separately, a mixture of 18 parts of water and 0.4 parts of EMAL 20C (Kao Corporation) was prepared. The two mixtures were combined, mixed and emulsified by a homogenizer, and concentrated under reduced pressure at 30° C. to obtain a fine particle dispersion with a solids content of 17.2%. The particle size of fine particles in the fine particle dispersion was 65 nm in terms of volume average diameter. Hereinafter, this product is referred to as fine particle dispersion (A-1).

Production Example 2

Preparation of Fine Particle Dispersion (A-2)

A mixture of 16 parts of ethyl acetate, 2.7 parts of dispersible polymer (PA-4) Mw=33000 (solids content 50%) and 0.45 parts of oil-soluble dye (M-1) below was prepared. Separately, a mixture of 18 parts of water and 0.4 parts of EMAL 20C (Kao Corporation) was prepared. The two mixtures were combined, mixed and emulsified by a homogenizer, and concentrated under reduced pressure at 30° C. to obtain a fine particle dispersion with a solids content of 16.8%. The particle size of fine particles in the fine particle dispersion was 95 nm in terms of volume average diameter. Hereinafter, this product is referred to as fine particle dispersion (A-2).

Production Example 3

Preparation of Fine Particle Dispersion (A-3)

A mixture of 16 parts of ethyl acetate, 2.7 parts of dispersible polymer (PA-7) Mw=24300 (solids content 50%) and 0.45 parts of oil-soluble dye (M-1) below was prepared. Separately, a mixture of 18 parts of water and 0.4 parts of EMAL 20C (Kao Corporation) was prepared. The two mixtures were combined, mixed and emulsified by a homogenizer, and concentrated under reduced pressure at 30° C. to obtain a fine particle dispersion with a solids content of 17.8%. The particle size of fine particles in the fine particle dispersion was 72 nm in terms of volume average diameter. Hereinafter, this product is referred to as fine particle dispersion (A-3).

Production Example 4

Preparation of Fine Particle Dispersion (A-4)

A mixture of 16 parts of ethyl acetate, 2.7 parts of dispersible polymer (PA-9) Mw=19000 (solids content 50%) and 0.45 parts of oil-soluble dye (M-1) below was prepared. Separately, a mixture of 18 parts of water and 0.4 parts of EMAL 20C (Kao Corporation) was prepared. The two mixtures were combined, mixed and emulsified by a homogenizer, and concentrated under reduced pressure at 30° C. to obtain a fine particle dispersion with a solids content of 16.5%. The particle size of fine particles in the fine particle dispersion was 102 nm in terms of volume average diameter. Hereinafter, this product is referred to as fine particle dispersion (A-4).

Production Examples 5 to 8

Preparation of Fine Particle Dispersions (A-5 to A-8)

Fine particle dispersions were prepared in the same manner as in Production Example 1 except that PA-12, 13, 15 or 16 (which were mixtures of n-butyl acrylate/t-butyl acrylamide=80:20, 90:10, 20:80, and 10:90, respectively) was used in place of PA-1 in Production Example 1. These products are referred to as fine particle dispersions (A-5) to (A-8).

Production Examples 9 to 14

Preparation of Fine Particle Dispersions (A-9 to A-14)

Fine particle dispersions were prepared in the same manner as in Production Example 1 except that PA-13, 12, 11, 1, 14, 15 or 16 (which were mixtures of n-butyl acrylate/t-butyl acrylamide=90:10, 80:20, 70:30, 50:50, 30:70, 20:80 and 10:90, respectively) was used in place of PA-1 in Production Example 1. These products are referred to as fine particle dispersions (A-9) to (A-14).

Comparative Production Example 1

Preparation of Fine Particle Dispersion (B-1)

A mixture of 16 parts of ethyl acetate, 2.7 parts of a dispersible polymer (n-butyl acrylate only, Mw=19700) (solids content 50%) and 0.45 parts of oil-soluble dye (M-1) below was prepared. Separately, a mixture of 18 parts of water and 0.4 parts of EMAL 20C (Kao Corporation) was prepared. The two mixtures were combined, mixed and emulsified by a homogenizer, and concentrated under reduced pressure at 30° C. to obtain a fine particle dispersion with a solids content of 17.4%. The particle size of fine particles in the fine particle dispersion was 67 nm in terms of volume average diameter. Hereinafter, this product is referred to as fine particle dispersion (B-1).

Comparative Production Example 2

Preparation of Fine Particle Dispersion (B-2)

A fine particle dispersion was prepared in the same manner as in Comparative Production Example 1 except that n-butyl acrylate/2-carboxyethyl acrylate=70/30 was used in place of butyl acrylate in Comparative Production Example 1. This product is referred to as fine particle dispersion (B-2).

The item "Dispersion" was expressed as being excellent when aggregation hardly occurred and the particle size (volume-average diameter) was 300 nm or less.

TABLE 1

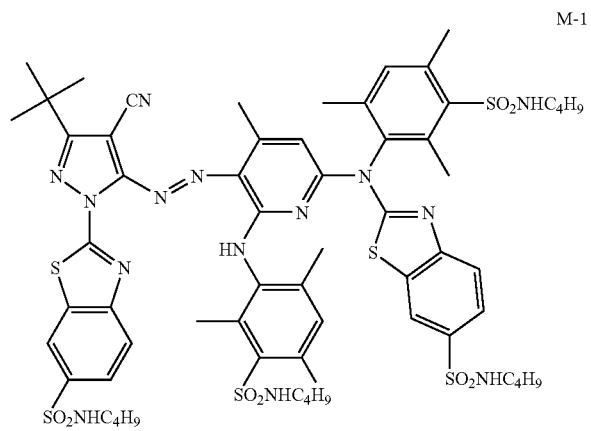

M-1

| | Dispersible polymer | Colorant | Dispersion | Particle diameter (nm) | Remark |
|---|---|---|---|---|---|
| Production Example 1 | PA-1 | M-1 | Excellent | 65 | The invention |
| Production Example 2 | PA-4 | M-1 | Excellent | 95 | The invention |
| Production Example 3 | PA-7 | M-1 | Excellent | 72 | The invention |
| Production Example 4 | PA-9 | M-1 | Excellent | 102 | The invention |
| Production Example 5 | PA-12 | M-1 | Excellent | 85 | The invention |
| Production Example 6 | PA-13 | M-1 | Excellent | 82 | The invention |
| Production Example 7 | PA15 | M-1 | Excellent | 96 | The invention |
| Production Example 8 | PA-16 | M-1 | Excellent | 110 | The invention |
| Comparative Production Example 1 | n-Butyl acrylate | M-1 | Excellent | 67 | Comparative Example |
| Comparative Production Example 2 | n-Butyl acrylate/ 2-carboxyethyl acrylate | M-1 | Excellent | 91 | Comparative Example |

As is evident from the results in Table 1, fine particle dispersions of small particle size and free of aggregation can be produced.

Example 2

<Preparation of Ink 01>

The following materials were mixed and filtered through a 0.45 μm filter to prepare an aqueous ink 01 for ink-jet recording.

| | |
|---|---|
| Fine particle dispersion (A-1) | 50 parts |
| Diethylene glycol | 5 parts |
| Glycerin | 18 parts |
| Diethanol amine | 1 part |
| Olefin E1010 | 0.9 parts |
| Water | amount to adjust the total to 100 parts |

<Preparation of Ink 02>

The following materials were mixed and filtered through a 0.45 μm filter to prepare an aqueous ink 02 for ink-jet recording.

| | |
|---|---|
| Fine particle dispersion (A-1) | 50 parts |
| Diethylene glycol | 5 parts |
| Glycerin | 10 parts |
| 1,2-Hexane diol | 8 parts |
| Diethanol amine | 1 part |
| Olefin E1010 | 0.9 parts |
| Water | amount to adjust the total to 100 parts |

<Preparation of Ink 03>

Aqueous ink 03 for ink-jet recording was prepared in the same manner as in production of the ink 01 except that the fine particle dispersion (A-2) prepared in Production Example 2 in Example 1 was used in place of the fine particle dispersion (A-1).

<Preparation of Inks 04 to 09>

Aqueous inks 04 to 09 for ink-jet recording were prepared respectively in the same manner as in production of the ink 01 except that the fine particle dispersions (A-3) to (A-8) prepared in Production Examples 3 to 8 in Example 1 were used in place of the fine particle dispersion (A-1).

<Preparation of Comparative Ink 1>

The following materials were mixed and filtered through a 0.45 μm filter to prepare a comparative aqueous ink 1 for ink-jet recording.

| | |
|---|---|
| Fine particle dispersion (B-1) in Comparative Production Example 1 | 50 parts |
| Diethylene glycol | 5 parts |
| Glycerin | 18 parts |
| Diethanol amine | 1 part |
| Olefin E1010 | 0.9 parts |
| Water | amount to adjust the total to 100 parts |

<Preparation of Comparative Ink 2>

Comparative aqueous ink 2 for ink-jet recording was prepared by mixing the materials and filtering the mixture through a 0.45 μm filter in the same manner as in production of the comparative ink 1 except that the fine particle dispersion (B-2) was used in place of the fine particle dispersion (B-1) in Comparative Production Example 1.

<Preparation of Comparative Ink 3>

The following materials were mixed and filtered through a 0.45 μm filter to prepare a comparative aqueous ink 3 for ink-jet recording.

| | |
|---|---|
| Water-soluble dye DD-1 (oxidation potential 0.86 V) | 4 parts |
| Diethylene glycol | 8 parts |
| Triethylene glycol monobutyl ether | 7 parts |
| Glycerin | 10 parts |
| Diethanol amine | 1 part |
| Olefin E1010 | 0.2 parts |
| Water | amount to adjust the total to 100 parts |

DD-1

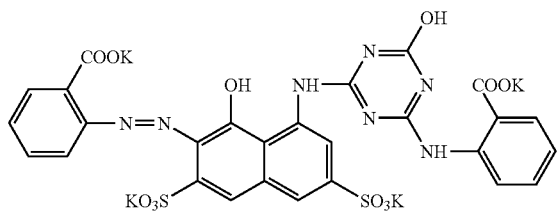

—Image Recording and Evaluation—

Each of the inks prepared above was introduced into a cartridge in an ink-jet printer MC-2000 (manufactured by Epson). Using this printer, an image was recorded on the plane paper for PPC and on the ink-jet gloss photo paper "KASSAI" (Fuji Photo Film Co., Ltd.) and evaluated as follows. The evaluation results are shown in Table 2.

<Evaluation of Printing Performance>

The cartridge was set in the printer, and after discharge of the ink through all nozzles was confirmed, an image was outputted onto 10 sheets of A4 paper, and disorder of printed image was evaluated on the basis of the following evaluation criteria.

A: No disorder of printed image occurred from the start to end of printing.
B: The disorder of printed image sometimes occurred from the start to end of printing.
C: Printed images were disordered from the start to end of printing.

<Evaluation of Dependency on Kind of Paper>

The image formed on the gloss photo paper and the image formed on the plane paper for PPC were compared by examining their tone and evaluated in the following 3 ranks: A was given when there was no or little difference between the two images, B was given when the difference between the two images was small, and C was given when the difference between the two images was large.

<Evaluation of Water Resistance>

The photo gloss paper on which the image had been formed was dried for 1 hour at room temperature, then dipped in water for 30 seconds and air-dried at room temperature to observe bleeding. Water resistance was evaluated in 3 ranks: A was given when there was no bleeding, B was given when slight bleeding occurred, and C was given when considerable bleeding occurred.

<Evaluation of Rubbing Resistance>

In the gross photo paper on which the image had been formed, the image 30 minutes after printing was rubbed 10 times with an eraser to observe a change. Rubbing resistance was evaluated in 3 ranks: A was given when the density was not reduced, B was given when the density was slightly reduced, and C was given when the density was considerably reduced.

<Evaluation of Light Fastness>

The gross photo paper on which the image had been formed was irradiated with xenon light (85000 lx) from a weather meter (ATLAS C. 165) for 4 days, and the density of the image before and after irradiation with xenon was measured with a reflective densitometer (X-Rite 3 1 OTR) and evaluated as the degree of remaining dye. The reflective density was measured at 3 points, those are, 1, 1.5 and 2.0. Light fastness was evaluated in 5 ranks: A was given when the degree of remaining dye at any density was 90% or higher, B was given when the degree was 89 to 80%, C was given when the degree was 79 to 70%, D was given when the degree was 69 to 50%, and E was given when the degree was lower than 49%.

<Ozone Resistance>

The density of the image before and after storage under the condition of 1.0 ppm ozone for 3 days was measured with X-rite 310, and the degree of remaining dye was thus determined to evaluate ozone resistance. Ozone resistance was evaluated in 5 ranks: A was given when the degree of remaining dye was 90% or higher, B was given when the degree was 89 to 80%, C was given when the degree was 79 to 70%, D was given when the degree was 69 to 50%, and E was given when the degree was lower than 49%.

<Evaluation of the Dispersion Applied by a Bar Coater onto OHP Transparent Support>

Samples obtained by applying the fine particle dispersions A-1 to A-8 by a bar coater onto OHP transparent supports were also examined for light fastness and ozone resistance as described above. The results are shown in Table 3.

<Evaluation of Ink Permeability>

The ink liquid, 15 μL, was dropped onto ink-jet gloss photo paper "KASSAI" (Fuji Photo Film Co., Ltd.), and the ink droplet was observed with a high-speed camera, and the time having elapsed until the ink permeated the paper after dropping was measured. The ink permeability was evaluated in 3 ranks: A was given when the permeation time was 1 second or less, B was given when the time was 1 to less than 30 seconds, and C was given when the time was 30 seconds or more.

In this evaluation, the permeation time of ink No. 1 was 29 seconds, and the permeation time of ink No. 2 was 14 seconds, thus revealing that the absorptivity of ink was improved by using 1,2-hexane diol.

<Difference Due to Type of Paper>

The ink No. 1 was used in printing on ink-jet gloss photo paper "KASSAI" (Fuji Photo Film Co., Ltd.) including an inorganic fine particle-containing porous image-receiving layer and on plane paper for PPC, respectively, and as a result, the gloss photo paper was superior in gloss to the paper for PPC.

TABLE 2

| Ink No. | Fine colorant particle dispersion | Dispersible polymer | Printing performance | Dependency on kind of paper | Water resistance | Rubbing resistance | Light fastness | Ozone resistance | Remark |
| --- | --- | --- | --- | --- | --- | --- | --- | --- | --- |
| 1 | A-1 | PA-1 | A | A | A | A | A | A | The invention |
| 2 | A-1 | PA-1 | A | A | A | A | A | A | The invention |
| 3 | A-2 | PA-4 | A | A | A | A | A | A | The invention |
| 4 | A-3 | PA-7 | A | A | A | A | A | A | The invention |

TABLE 2-continued

| Ink No. | Fine colorant particle dispersion | Dispersible polymer | Printing performance | Dependency on kind of paper | Water resistance | Rubbing resistance | Light fastness | Ozone resistance | Remark |
|---|---|---|---|---|---|---|---|---|---|
| 5 | A-4 | PA-9 | A | A | A | A | A | A | The invention |
| 6 | A-5 | PA-12 | A | A | A | A | B | A | The invention |
| 7 | A-6 | PA-13 | A | A | A | A | B | B | The invention |
| 8 | A-7 | PA-15 | A | A | A | A | A | A | The invention |
| 9 | A-8 | PA-16 | A | A | A | A | A | A | The invention |
| Comparative Example 1 | B-1 | n-Butyl acrylate | A | A | A | A | C | C | Comparative Example |
| Comparative Example 2 | B-2 | n-Butyl acrylate/2-carboxyethyl acrylate | A | A | A | A | D | D | Comparative Example |
| Comparative Example 3 | None | None | A | A | B | A | D | E | Comparauve Example |

TABLE 3

| Ink No. | Fine colorant particle dispersion | Dispersible polymer | Light fastness | Ozone resistance | Remark |
|---|---|---|---|---|---|
| 1 | A-1 | PA-1 | A | A | The invention |
| 2 | A-1 | PA-1 | A | A | The invention |
| 3 | A-2 | PA-4 | A | A | The invention |
| 4 | A-3 | PA-7 | A | A | The invention |
| 5 | A-4 | PA-9 | A | A | The invention |
| 6 | A5 | PA-12 | B | A | The invention |
| 7 | A-6 | PA-13 | B | B | The invention |
| 8 | A-7 | PA-15 | A | A | The invention |
| 9 | A-8 | PA-16 | A | A | The invention |
| Comparative Example 1 | B-1 | n-Butyl acrylate | C | C | Comparative Example |
| Comparative Example 2 | B-2 | n-Butyl acrylate/2-carboxyethyl acrylate | D | D | Comparative Example |
| Comparative Example 3 | None | None | D | E | Comparative Example |

As is evident from the results in Table 2, the ink-jet recording ink Nos. 1, 3 to 5, 8 and 9 using the fine particle dispersions comprising the dispersible polymer having the specific structure in the invention and the ink-jet recording ink No. 2 using 1,2-hexane diol as the ink solvent were excellent in printing performance, free of dependency on kind of paper and excellent in water resistance, high-degree rubbing resistance, light fastness, and ozone resistance. It was also found that in ink Nos. 6 and 7 wherein the content of the specific structure in the invention was low tend to lower light fastness and ozone resistance slightly. Further it can be seen that the content of the specific structure is also important for improving performance.

As can be seen from Table 3, the fine particle dispersions including the dispersible polymer having the specific structure in the invention, not only as ink-jet ink but also as a coating obtained by directly applying the dispersion by hands, are excellent in light fastness and ozone resistance.

On the other hand, it can be seen that the ink-jet recording inks in Comparative Examples 1 and 2 using the fine particle dispersions including the dispersible polymer not having such a specific structure, and the ink-jet recording ink in Comparative Example 3 not using the fine particles of the invention, are inferior in some performances.

The fine particle dispersion of the invention is easy to handle, and has low odor-generating and high safety properties, wherein the particle size of the dispersion particle is small and the dispersion has superior dispersion stability and storage stability. An ink composition containing the fine particle dispersion is free from clogging at the end of a nozzle and has superior discharge stability; has superior coloration and tone (hue) regardless of the type of paper used; has superior ink permeability even when using the photo quality paper mentioned above; has superior water resistance after printing, image preservability (in particular, light fastness and ozone resistance), and rubbing resistance; and enables high quality ink-jet printing at high density.

As described above, by using the ink-jet recording ink containing the fine particle dispersion including the dispersible polymer having the specific structure of the invention, it is possible to provide an ink-jet recording ink and an ink-jet recording method which, when printing or the like using a nozzle or the like, do not clog the end of the nozzle, and have superior water resistance, rubbing resistance and light fastness when printed on arbitrarily selected paper, regardless of the type of paper used.

What is claimed is:

1. A fine particle dispersion, wherein fine particles comprising an oil-soluble dye having an oxidation potential higher than 1.0 V vs SCE and a polymer having at least one of an amide group, a glycidyl group and a hydroxyl group are dispersed in an aqueous medium, and the oil-soluble dye is represented by Formula (Y-II), Formula (Y-III) or Formula (Y-IV):

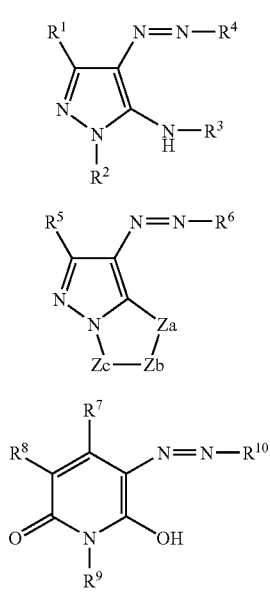

Formula (Y-II)

Formula (Y-III)

Formula (Y-IV)

wherein, in Formula (Y-II), $R^1$ and $R^3$ each independently represent a hydrogen atom, a cyano group, an alkyl group, a cycloalkyl group, an aralkyl group, an alkoxy group, an alkylthio group, an arylthio group, an aryl group or an ionic hydrophilic group, $R^2$ represents a hydrogen atom, an alkyl group, a cycloalkyl group, an aralkyl group, a carbamoyl group, an acyl group, an aryl group or a heterocyclic group, and $R^4$ represents a heterocyclic group;

in Formula (Y-III), $R^5$ represents a hydrogen atom, a cyano group, an alkyl group, a cycloalkyl group, an aralkyl group, an alkoxy group, an alkylthio group, an arylthio group, an aryl group or an ionic hydrophilic group, Za represents —N=, —NH—, or C($R^{11}$), Zb and Zc each independently represent —N= or C($R^{11}$)=, where $R^{11}$ represents a hydrogen atom or a nonmetallic substituent group, and $R^6$ represents a heterocyclic group;

in Formula (Y-IV), $R^7$ and $R^9$ each independently represent a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group, $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxy group or an ionic hydrophilic group, and $R^{10}$ represents a heterocyclic group.

2. The fine particle dispersion according to claim 1, wherein the weight average molecular weight of the polymer is 2000 to 50000.

3. An ink composition comprising a fine particle dispersion, wherein fine particles comprising an oil-soluble dye having an oxidation potential higher than 1.0 V vs SCE and a polymer having at least one of an amide group, a glycidyl group and a hydroxyl group are dispersed in an aqueous medium, and the oil-soluble dye is represented by Formula (Y-II), Formula (Y-III) or Formula (Y-IV):

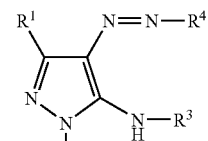

Formula (Y-II)

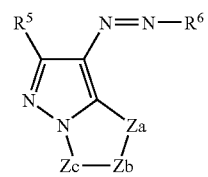

Formula (Y-III)

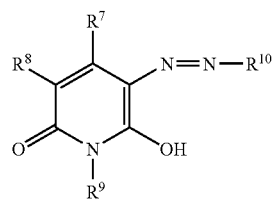

Formula (Y-IV)

wherein, in Formula (Y-II), $R^1$ and $R^3$ each independently represent a hydrogen atom, a cyano group, an alkyl group, a cycloalkyl group, an aralkyl group, an alkoxy group, an alkylthio group, an arylthio group, an aryl group or an ionic hydrophilic group, $R^2$ represents a hydrogen atom, an alkyl group, a cycloalkyl group, an aralkyl group, a carbamoyl group, an acyl group, an aryl group or a heterocyclic group, and $R^4$ represents a heterocyclic group;

in Formula (Y-III), $R^5$ represents a hydrogen atom, a cyano group, an alkyl group, a cycloalkyl group, an aralkyl group, an alkoxy group, an alkyithio group, an arylthio group, an aryl group or an ionic hydrophilic group, Za represents —N=, —NH—, or C($R^{11}$), Zb and Zc each independently represent —N=, or C($R^{11}$)=, where $R^{11}$ represents a hydrogen atom or a nonmetallic substituent group, and $R^6$ represents a heterocyclic group;

in Formula (Y-IV), $R^7$ and $R^9$ each independently represent a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group, $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxy group or an ionic hydrophilic group, and $R^{10}$ represents a heterocyclic group.

4. The ink composition according to claim 3, wherein the weight average molecular weight of the polymer is 2000 to 50000.

5. The ink composition according to claim 3, further comprising at least one compound selected from the group consisting of alcohols, polyvalent alcohols and water-soluble glycol ethers.

6. An ink-jet recording method comprising recording an image on a recording material using the ink composition according to claim 3.

7. An ink-jet recording method comprising recording an image on a recording material using the ink composition according to claim 4.

8. An ink-jet recording method comprising recording an image on a recording material using the ink composition according to claim 5.

9. The ink-jet recording method according to claim 6, wherein the recording material is a recording material comprising an inorganic fine particle-containing porous ink receiving layer.

10. The ink-jet recording method according to claim 7, wherein the recording material is a recording material comprising an inorganic fine particle-containing porous ink receiving layer.

11. The ink-jet recording method according to claim 8, wherein the recording material is a recording material comprising an inorganic fine particle-containing porous ink receiving layer.

12. The ink composition according to claim 3, wherein the polymer comprises a hydrophobic polymer moiety and a hydrophilic polymer moiety.

13. The ink composition according to claim 3, wherein the polymer is a vinyl polymer.

14. The ink composition according to claim 12, wherein, in the polymer, the content amount of the hydrophobic polymer moiety is 60 to 80% by mass, and the content amount of the hydrophilic polymer moiety is 20 to 40% by mass.

15. The ink composition according to claim 3, wherein, in the polymer, the content amount of the amide group is 10 to 90% by mass, the content amount of the glycidyl group is 10 to 90% by mass, and the content amount of the hydroxyl group is 10 to 70% by mass.

16. The ink composition according to claim 3, wherein the solubility of the oil-soluble dye in water at 25° C. is 0.1 g or less, the solubility being the mass of a dye soluble in 100 g of water.

17. The ink composition according to claim 3, wherein the content amount of the oil-soluble dye in the fine particle dispersion is 0.2 to 6% by mass.

18. The ink composition according to claim 3, wherein the amount of the polymer used in the fine particle dispersion is 50 to 600 parts by mass per 100 parts by mass of the oil-soluble dye.

19. The ink composition according to claim 3, wherein the content amount of the fine particles in the fine particle dispersion is 2 to 30% by mass.

20. The ink composition according to claim 3, wherein the average particle size of the fine particles is 3 to 200 nm.

21. The fine particle dispersion according to claim 1, wherein the polymer has a glycidyl group.

22. The ink composition according to claim 3, wherein the polymer has a glycidyl group.

23. The ink jet recording method according to claim 6, wherein the polymer has a glycidyl group.

* * * * *